US011560482B2

(12) United States Patent
Wang

(10) Patent No.: US 11,560,482 B2
(45) Date of Patent: Jan. 24, 2023

(54) FLOWER POT WITH FAUX-RUST EFFECT AND ITS MANUFACTURING METHOD

(71) Applicant: Dongguan Sunland Technology Co., Ltd., Dongguan (CN)

(72) Inventor: Yi Wang, Dongguan (CN)

( * ) Notice: Subject to any disclaimer, the term of this patent is extended or adjusted under 35 U.S.C. 154(b) by 803 days.

(21) Appl. No.: 16/449,243

(22) Filed: Jun. 21, 2019

(65) Prior Publication Data

US 2020/0317933 A1 Oct. 8, 2020

(30) Foreign Application Priority Data

Apr. 3, 2019 (CN) ........................ 201910265090.X

(51) Int. Cl.

| | |
|---|---|
| ***C09D 5/02*** | (2006.01) |
| ***C09D 7/61*** | (2018.01) |
| ***C09D 7/20*** | (2018.01) |
| ***C09D 7/43*** | (2018.01) |
| ***C09D 7/45*** | (2018.01) |
| ***A01G 9/02*** | (2018.01) |
| ***C09D 5/28*** | (2006.01) |
| ***C09D 7/63*** | (2018.01) |
| *C08K 3/08* | (2006.01) |

(52) U.S. Cl.

CPC ............... *C09D 5/024* (2013.01); *A01G 9/02* (2013.01); *C09D 5/025* (2013.01); *C09D 5/027* (2013.01); *C09D 5/028* (2013.01); *C09D 5/28* (2013.01); *C09D 7/20* (2018.01); *C09D 7/43* (2018.01); *C09D 7/45* (2018.01); *C09D 7/61* (2018.01); *C09D 7/63* (2018.01); *C08K 2003/0856* (2013.01)

(58) Field of Classification Search

CPC . C09D 5/024; C09D 7/61; C09D 7/20; C09D 7/43; C09D 7/63; C09D 5/025; C09D 5/027; C09D 5/028; C09D 5/28; A01G 9/02; C08K 2003/0856

See application file for complete search history.

*Primary Examiner* — Robert S Walters, Jr.

(74) *Attorney, Agent, or Firm* — Tsz Lung Yeung

(57) ABSTRACT

A flower pot includes a main body having an external surface and a faux-rust effect layer formed on the external surface of the main body. The faux-rust effect layer includes 5.8 to 20 parts by weight of water, 0.21 to 4.7 parts by weight of additives, 0.1 to 1 parts by weight of dispersant, 0.05 to 0.5 parts by weight of lubricant, 0.2 to 2 parts by weight of ethylene glycol, 0.5 to 2 parts by weights of dodecyl alcohol ester, 8.2 to 25 parts by weight of emulsion agent, 40 to 60 parts by weight of ferrous metal ore powder, 0.1 to 0.9 parts by weight of thickener, 0.1 to 0.2 parts by weight of sterilizing agent, and 0.05 to 0.1 parts by weight of preservative.

8 Claims, 4 Drawing Sheets

FLOWER POT WITH FAUX-RUST EFFECT AND ITS MANUFACTURING METHOD

BACKGROUND OF THE PRESENT INVENTION

Field of Invention

The present invention relates to a flower pot, and more particularly to a flower pot having a faux-rust effect through applying a layer of faux-rust paint.

Description of Related Arts

Faux-rust finish is a special kind of surface finishing in which a surface of an object may be artificially coated with a special coating agent so as to imitate a rusting effect the object. Since faux-rust finish is an artificial imitation of an actual rusting surface, many different kinds of rusting patterns can be formed on the surface to create dedicated texture patterns or embossing effects. These in turn create natural texture of metal corrosion on an object's surface. This technology is extremely suitable for producing sculptures, models, crafts, or background walls.

Conventional faux-rust finishing technology involves immersing the object or particular surfaces in specific acidic solutions. Thus, the use of a large amount of acids may pose serious health hazards for technicians as well as to the environment as well.

As a result, there is a need to improve upon conventional faux-rust finishing process so as to make it more environmentally friendly, and to pose less health hazards to relevant technicians. Moreover, there is also a need to develop a faux-rust finishing process which is simpler and more convenient to operate when compared to traditional faux-rust finishing processes.

SUMMARY OF THE PRESENT INVENTION

Certain variations of the present invention provide a flower pot having a faux-rust effect through applying a layer of faux-rust paint.

Certain variations of the present invention provide a flower pot comprising a faux-rust effect layer which is capable of imitating metal corrosion effect on an external surface of the flower pot.

Certain variations of the present invention provide a method of manufacturing a flower pot comprising a faux-rust effect layer which is capable of imitating metal corrosion effect on an external surface of the flower pot.

In one aspect of the present invention, it provides a flower pot, comprising:

a main body having an external surface; and a faux-rust effect layer formed on the external surface of the main body, the faux-rust effect layer comprising 5.8 to 20 parts by weight of water, 0.21 to 4.7 parts by weight of additives, 0.1 to 1 parts by weight of dispersant, 0.05 to 0.5 parts by weight of lubricant, 0.2 to 2 parts by weight of ethylene glycol, 0.5 to 2 parts by weights of dodecyl alcohol ester, 8.2 to 25 parts by weight of emulsion agent, 40 to 60 parts by weight of ferrous metal ore powder, 0.1 to 0.9 parts by weight of thickener, 0.1 to 0.2 parts by weight of sterilizing agent, and 0.05 to 0.1 parts by weight of preservative.

In another aspect of the present invention, it provides a method of manufacturing a flower pot having a main body and an external surface, comprising the steps of:

(a) applying a predetermined layer of primer layer on the external surface of the main body;

(b) providing a mixture of a faux-rust effect layer, the faux-rust effect layer comprising 5.8 to 20 parts by weight of water, 0.21 to 4.7 parts by weight of additives, 0.1 to 1 parts by weight of dispersant, 0.05 to 0.5 parts by weight of lubricant, 0.2 to 2 parts by weight of ethylene glycol, 0.5 to 2 parts by weights of dodecyl alcohol ester, 8.2 to 25 parts by weight of emulsion agent, 40 to 60 parts by weight of ferrous metal ore powder, 0.1 to 0.9 parts by weight of thickener, 0.1 to 0.2 parts by weight of sterilizing agent, and 0.05 to 0.1 parts by weight of preservative;

(c) applying the faux-rust effect layer on the primer layer;

(d) applying a reactance layer on the faux-rust effect layer; and (e) applying a finishing layer on the reactance layer to form the flower pot.

In another aspect of the present invention, it provides a flower pot, being manufactured by a method comprising the steps of:

(a) applying a predetermined layer of primer layer on the external surface of the main body;

(b) providing a mixture of a faux-rust effect layer, the faux-rust effect layer comprising 5.8 to 20 parts by weight of water, 0.21 to 4.7 parts by weight of additives, 0.1 to 1 parts by weight of dispersant, 0.05 to 0.5 parts by weight of lubricant, 0.2 to 2 parts by weight of ethylene glycol, 0.5 to 2 parts by weights of dodecyl alcohol ester, 8.2 to 25 parts by weight of emulsion agent, 40 to 60 parts by weight of ferrous metal ore powder, 0.1 to 0.9 parts by weight of thickener, 0.1 to 0.2 parts by weight of sterilizing agent, and 0.05 to 0.1 parts by weight of preservative;

(c) applying the faux-rust effect layer on the primer layer;

(d) applying a reactance layer on the faux-rust effect layer; and (e) applying a finishing layer on the reactance layer to form the flower pot.

This summary presented above is provided merely to introduce certain concepts and not to identify any key or essential features of the claimed subject matter.

BRIEF DESCRIPTION OF THE DRAWINGS

FIG. 4 is a schematic diagram of the flower pot according to the preferred embodiment of the present invention, illustrating the faux-rust effect thereof.

DETAILED DESCRIPTION OF THE PREFERRED EMBODIMENT

Figure 1:
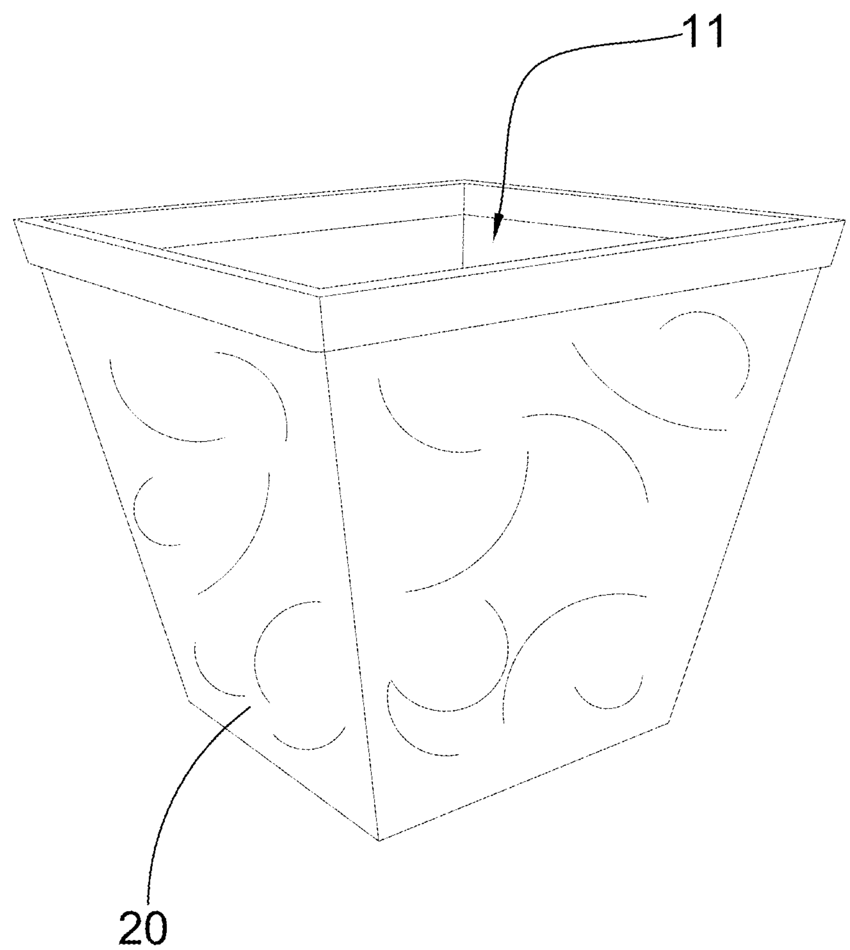
FIG. 1 is a perspective view a flower pot according to a preferred embodiment of the present invention.
Figure 2:
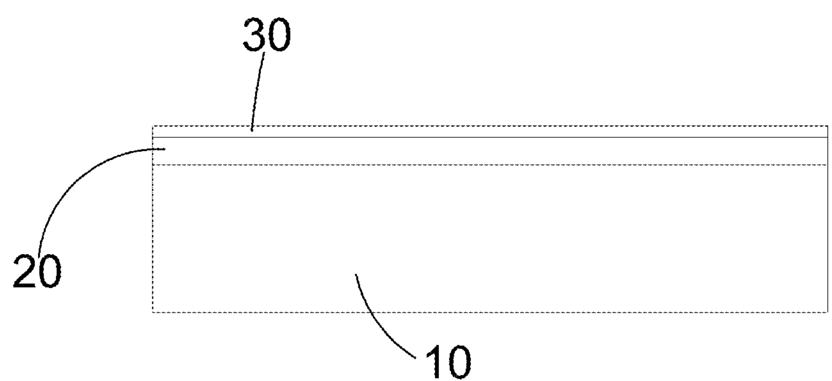
FIG. 2 is a sectional schematic diagram of the flower pot according to the preferred embodiment of the present invention.

The following detailed description of the preferred embodiment is the preferred mode of carrying out the invention. The description is not to be taken in any limiting sense. It is presented for the purpose of illustrating the general principles of the present invention.

Referring to FIGS. 1 to 4 of the drawings, a flower pot according a preferred embodiment of the present invention is illustrated. Broadly, the flower pot may comprise a main body 10 having an external surface 11, and a faux-rust effect layer 20. The flower pot may be adapted for containing a wide variety of plants, such as flowers or small trees. The flower pot may be configured from non-metallic material.

The faux-rust effect layer 20 may be formed on the external surface 11 of the main body 10. The faux-rust effect layer 20 may comprise 5.8 parts by weight to 20 parts by weight of water, 0.21 parts by weight to 4.7 parts by weight of additives, 0.1 parts by weight to 1 parts by weight of dispersant, 0.05 parts by weight to 0.5 parts by weight of lubricant, 0.2 parts by weight to 2 parts by weight of ethylene glycol, 0.5 parts by weight to 2 parts by weight of dodecyl alcohol ester, 8.2 parts by weight to 25 parts by weight of emulsion agent, 40 parts by weight to 60 parts by weight of ferrous metal ore powder, 0.1 parts by weight to 0.9 parts by weight of thickener, 0.1 parts by weight to 0.2 parts by weight of sterilizing agent, and 0.05 parts by weight to 0.1 parts by weight of preservative.

According to the preferred embodiment of the present invention, the main body 10 of the flower pot may be configured to have a receiving cavity for storing plants and may have a wide variety of cross-sectional shapes. For example, the main body 10 may be configured as having a substantially circular cross-sectional shape when viewed from the top. Other cross-sectional shape may also be possible.

The faux-rust effect may be interpreted as having an appearance which resembles iron rusting on a surface. The faux-rust effect layer 20 may create the aesthetic appearance of iron rusting while preventing the actual corrosion or damage resulting from the rusting process on the main body 10. In fact, the faux-rust effect layer 20 as described above may have enhanced bonding performance, enhanced wear and tear resistance performance, enhanced chemical resistance performance, enhanced temperature insulation performance, and enhanced cohesiveness performance. Moreover, the faux-rust effect layer 20 thus composited may have enhanced color preservation performance.

The additives mentioned above may comprise a number of different additives agents in predetermined composition by weight. In this preferred embodiment, the additives may comprise a liquid additive 2-amino-2-methyl-1-propanol containing 5% by weight of added water. The composition by weight of this liquid additive may be 0.05 parts by weight to 0.2 parts by weight.

Another additive may be degassing agent, such as additive ASAN320. The overall composition by weight (with respect to the faux-rust effect layer 20) of this liquid additive may be 0.15 parts by weight to 2.5 parts by weight of the faux-rust effect layer 20.

Another additive may be active thickening rheological additive. The overall composition by weight (with respect to the faux-rust effect layer 20) of this additive may be 0.01 parts by weight to 2 parts by weight of the faux-rust effect layer 20.

The preservative mentioned above may be configured as Benzothiazolinone based preservative. The sterilizing agent may be utilized to prevent growth of mildew and algae on the faux-rust effect layer 20.

A preferred composition of the faux-rust effect layer 20 may be as follows: 5.8 parts by weight of water, 0.217 parts by weight of additives, 0.1 parts by weight of dispersant, 0.05 parts by weight of lubricant, 0.2 parts by weight of ethylene glycol, 0.5 parts by weight of dodecyl alcohol ester, 8.2 parts by weight of emulsion agent, 40 parts by weight of ferrous metal ore powder, 0.1 parts by weight of thickener, 0.1 parts by weight of sterilizing agent, and 0.05 parts by weight of preservative.

The additives may comprise the following compositions by weight: 0.05 parts by weight of the liquid additive 2-amino-2-methyl-1-propanol containing 5% by weight of added water, 0.15 parts by weight of degassing agent, and 0.01 parts by weight of active thickening rheological additive.

A first alternative preferred composition of the faux-rust effect layer 20 may be as follows: 20 parts by weight of water, 4.7 parts by weight of additives, 1 parts by weight of dispersant, 0.5 parts by weight of lubricant, 2 parts by weight of ethylene glycol, 2 parts by weight of dodecyl alcohol ester, 25 parts by weight of emulsion agent, 60 parts by weight of ferrous metal ore powder, 0.9 parts by weight of thickener, 0.2 parts by weight of sterilizing agent, and 0.1 parts by weight of preservative.

The additives may comprise the following compositions: 0.2 parts by weight of the liquid additive 2-amino-2-methyl-1-propanol containing 5% by weight of added water, 2.5 parts by weight of degassing agent, and 2 parts by weight of active thickening rheological additive.

A second alternative preferred composition of the faux-rust effect layer 20 may be as follows: 12.9 parts by weight of water, 2.455 parts by weight of additives, 0.55 parts by weight of dispersant, 0.275 parts by weight of lubricant, 1.1 parts by weight of ethylene glycol, 1.25 parts by weight of dodecyl alcohol ester, 16.6 parts by weight of emulsion agent, 50 parts by weight of ferrous metal ore powder, 0.5 parts by weight of thickener, 0.15 parts by weight of sterilizing agent, and 0.075 parts by weight of preservative.

The additives may comprise the following compositions by weight: 0.125 parts by weight of the liquid additive 2-amino-2-methyl-1-propanol containing 5% by weight of added water, 1.325 parts by weight of degassing agent, and 0.995 parts by weight of active thickening rheological additive.

It is worth mentioning that the dodecyl alcohol ester may decrease a glass transition temperature (Tg) of the emulsion agent, and decrease a surface hardness of homopolymer and copolymer particles contained in the emulsion agent, so as to minimize minimum film forming temperature of the emulsion agent. As such, the emulsion agent may facilitate effective formation of thin film of the faux-rust effect layer 20.

Moreover, the ethylene glycol in the faux-rust effect layer 20 may facilitate effective dissolving of film-forming substances in the faux-rust effect layer 20.

Figure 3:
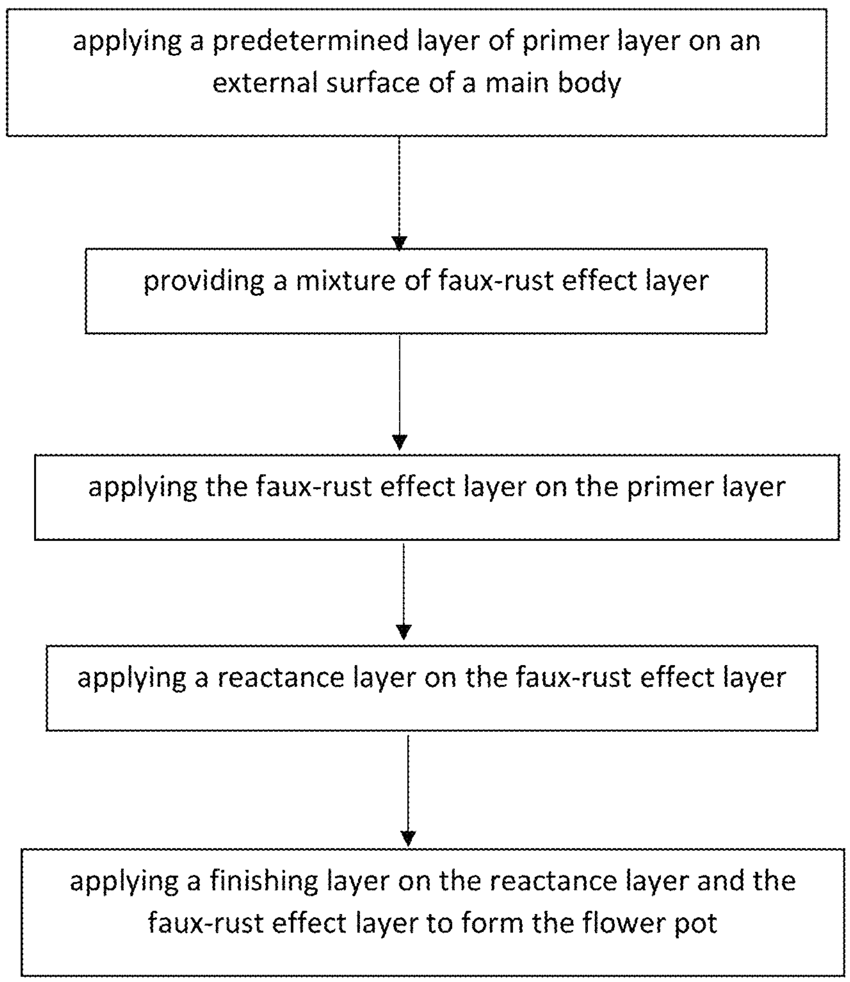
FIG. 3 is a schematic diagram of a method of manufacturing a flower pot according to the preferred embodiment of the present invention.

Referring to FIG. 3 of the drawings, a method of manufacturing a flower pot, comprising the steps of:

(a) applying a predetermined layer of primer layer on an external surface 11 of a main body 10;

(b) providing a mixture of faux-rust effect layer 20;

(c) applying the faux-rust effect layer 20 (as described above) on the primer;

(d) applying a reactance layer on the faux-rust effect layer 20; and (e) applying a finishing layer on the reactance layer to form the flower pot of the present invention.

In step (a), the primer layer may be used to allow the faux-rust effect layer 20 to be more adhering to the external surface 11 of the main body 10.

Step (b) comprises a step of sequentially mixing a predetermined composition of water, a predetermined composition of additives, a predetermine composition of dispersant, a predetermined composition of lubricant, a predetermined composition of ethylene glycol, a predetermined composition of dodecyl alcohol ester, a predetermined composition of emulsion agent, a predetermined composition of ferrous metal ore powder, a predetermined composition of thickener, a predetermined composition of sterilizing agent, and a predetermined composition of preservative. The predetermined compositions in this steps may be those described above.

The mixing speed of these mixtures may be 600 revolutions per minute. Mixing temperature may be controlled to 1 degree Celsius to 70 degree Celsius.

Step (b) further comprises the steps of adding the degassing agent in two intervals. Thus, the process involves adding a first dose of degassing agent into water, waiting a predetermined period of time, and adding a second dose of degassing agent into a mixture of the water and the first dose of degassing agent. The first dose may be 0.05 parts to 1 part by weight of degassing agent, while the second dose may be 0.1 parts to 1.5 parts by weight of degassing agent. These steps may be utilized for minimizing formation of bubbles in the mixture.

In step (d), the reactant may comprise 87 parts to 95 parts by weight of water, 1.5 parts to 4.5 parts by weight of copper chloride, 0.2 parts to 4.5 parts by weight of sodium chloride, 0.2 parts to 2 parts by weight of ethylene glycol, and 0.5 parts to 2 parts by weight of dodecyl alcohol ester. With the help of the reactant, faux-rust effect (rusting color and texture) may be rapidly formed on the external surface 11 of the main body 10.

In step (e), the finishing layer may be used to protect the faux-rust effect layer 20 so as to enhance the general life span of the present invention.

The advantageous effects of the present invention may be as follows: the present invention allow the use of faux-rust effect layer 20 and eliminate the need to use genuine iron or metal for creating rusting effect. As such, the main body 10 of the flower pot may be configured from non-metallic material, such as plastic material. This prevents the pollution problems which may be caused by forming a rusting pattern or color on a metallic or iron-made flower pot. Moreover, the non-metallic made flower pot will not rust and will not be corroded.

The present invention, while illustrated and described in terms of a preferred embodiment and several alternatives, is not limited to the particular description contained in this specification. Additional alternative or equivalent components could also be used to practice the present invention.

What is claimed is:

1. A flower pot, comprising:

a main body having an external surface; and a faux-rust effect layer formed on said external surface of said main body, said faux-rust effect layer comprising 5.8 to 20 parts by weight of water, 0.21 to 4.7 parts by weight of additives, 0.1 to 1 parts by weight of dispersant, 0.05 to 0.5 parts by weight of lubricant, 0.2 to 2 parts by weight of ethylene glycol, 0.5 to 2 parts by weights of dodecyl alcohol ester, 8.2 to 25 parts by weight of emulsion agent, 40 to 60 parts by weight of ferrous metal ore powder, 0.1 to 0.9 parts by weight of thickener, 0.1 to 0.2 parts by weight of sterilizing agent, and 0.05 to 0.1 parts by weight of preservative.

2. The flower pot, as recited in claim 1, wherein said faux-rust effect layer comprises 5.8 parts by weight of water, 0.217 parts by weight of additives, 0.1 parts by weight of dispersant, 0.05 parts by weight of lubricant, 0.2 parts by weight of ethylene glycol, 0.5 parts by weight of dodecyl alcohol ester, 8.2 parts by weight of emulsion agent, 40 parts by weight of ferrous metal ore powder, 0.1 parts by weight of thickener, 0.1 parts by weight of sterilizing agent, and 0.05 parts by weight of preservative.

3. The flower pot, as recited in claim 1, wherein said faux-rust effect layer comprises 20 parts by weight of water, 4.7 parts by weight of additives, 1 parts by weight of dispersant, 0.5 parts by weight of lubricant, 2 parts by weight of ethylene glycol, 2 parts by weight of dodecyl alcohol ester, 25 parts by weight of emulsion agent, 60 parts by weight of ferrous metal ore powder, 0.9 parts by weight of thickener, 0.2 parts by weight of sterilizing agent, and 0.1 parts by weight of preservative.

4. The flower pot, as recited in claim 1, wherein said faux-rust effect layer comprises 12.9 parts by weight of water, 2.455 parts by weight of additives, 0.55 parts by weight of dispersant, 0.275 parts by weight of lubricant, 1.1 parts by weight of ethylene glycol, 1.25 parts by weight of dodecyl alcohol ester, 16.6 parts by weight of emulsion agent, 50 parts by weight of ferrous metal ore powder, 0.5 parts by weight of thickener, 0.15 parts by weight of sterilizing agent, and 0.075 parts by weight of preservative.

5. The flower pot, as recited in claim 1, wherein said additives comprise 0.05 parts by weight to 0.2 parts by weight of 2-amino-2-methyl-1-propanol.

6. The flower pot, as recited in claim 5, wherein said additives comprise 0.15 parts by weight to 2.5 parts by weight of degassing agent.

7. The flower pot, as recited in claim 6, wherein said additives comprise 0.01 parts by weight to 2 parts by weight of active thickening rheological agent.

8. The flower pot, as recited in claim 7, wherein said preservative is a benzothiazolinone based preservative.

* * * * *